United States Patent
Vollenberg et al.

[11] Patent Number: 5,840,798
[45] Date of Patent: Nov. 24, 1998

[54] GLASS FILLED POLYESTER MOLDING COMPOSITION

[75] Inventors: Peter Hendrikus Theodorus Vollenberg, Evansville; Jon Walter Thompson, Vernon, both of Ind.

[73] Assignee: General Electric Company, Pittsfield, Mass.

[21] Appl. No.: 870,325

[22] Filed: Jun. 6, 1997

[51] Int. Cl.[6] .................................................. C08K 7/14
[52] U.S. Cl. ..................... 524/423; 428/399; 523/217; 524/494
[58] Field of Search ................................... 524/494, 423; 523/217; 428/399

[56] References Cited

U.S. PATENT DOCUMENTS

| | | |
|---|---|---|
| 2,465,319 | 3/1949 | Whinfield et al. . |
| 2,720,502 | 10/1955 | Caldwell . |
| 2,727,881 | 12/1955 | Caldwell et al. . |
| 2,822,348 | 2/1958 | Haslam . |
| 2,999,835 | 9/1961 | Goldberg . |
| 3,038,365 | 6/1962 | Peterson . |
| 3,047,539 | 7/1962 | Pengilly . |
| 3,153,008 | 10/1964 | Fox . |
| 3,334,154 | 8/1967 | Kim . |
| 3,635,895 | 1/1972 | Kramer . |
| 3,671,487 | 6/1972 | Abolins . |
| 3,808,180 | 4/1974 | Owens . |
| 3,953,394 | 4/1976 | Fox et al. . |
| 4,001,184 | 1/1977 | Scott . |
| 4,043,971 | 8/1977 | Wurmb et al. . |
| 4,096,202 | 6/1978 | Farnham et al. . |
| 4,123,415 | 10/1978 | Wambach ................. 524/494 |
| 4,123,436 | 10/1978 | Holub et al. . |
| 4,124,561 | 11/1978 | Phipps et al. ............ 524/494 |
| 4,128,526 | 12/1978 | Borman . |
| 4,131,575 | 12/1978 | Adelmann et al. . |
| 4,140,669 | 2/1979 | Phipps et al. . |
| 4,140,671 | 2/1979 | Cohen . |
| 4,180,494 | 9/1978 | Fromuth et al. . |
| 4,204,047 | 5/1980 | Margotte et al. . |
| 4,260,693 | 4/1981 | Liu . |
| 4,292,233 | 9/1981 | Binsack et al. . |
| 4,393,153 | 7/1983 | Hepp . |
| 4,460,731 | 7/1984 | Kochanowski et al. . |
| 4,636,234 | 1/1987 | Huey et al. .............. 428/399 |
| 4,636,544 | 1/1987 | Hepp . |
| 4,707,505 | 11/1987 | Matsuno et al. .......... 524/451 |
| 5,034,431 | 7/1991 | Hanley ................... 523/213 |
| 5,047,450 | 9/1991 | Wilder ................... 524/494 |
| 5,075,354 | 12/1991 | Mitsuuchi et al. ........ 523/217 |
| 5,149,734 | 9/1992 | Fisher et al. . |
| 5,208,277 | 5/1993 | Boudreaux .............. 524/494 |
| 5,441,997 | 8/1995 | Walsh et al. . |
| 5,500,473 | 3/1996 | Wissmann .............. 524/494 |
| 5,565,514 | 10/1996 | Carlberg ................ 524/494 |
| 5,654,395 | 8/1997 | Jackson et al. .......... 524/494 |
| 5,770,309 | 6/1998 | Houpt et al. ............ 428/399 |

FOREIGN PATENT DOCUMENTS

| | | |
|---|---|---|
| 387398 | 9/1990 | European Pat. Off. . |
| 56-147845 | 11/1981 | Japan . |
| 59-138253 | 8/1984 | Japan . |

OTHER PUBLICATIONS

"Reducing Warp in Thermoplastics with Glass Fibers", Plastics Engineering, May 1993, p. 23.

*Primary Examiner*—Veronica P. Hoke

[57] ABSTRACT

A reinforced polyester molding composition which, based on the weight of the total composition, comprises a polyester resin and glass fibers, wherein said glass fibers have a bimodal cross sectional area wherein one fiber type is selected to improve impact strength and the other fiber type is selected to improve warpage.

19 Claims, 1 Drawing Sheet

GLASS FILLED POLYESTER MOLDING COMPOSITION

FIELD OF THE INVENTION

This invention relates to polyester molding compositions containing glass fibers.

BACKGROUND OF THE INVENTION

Fibrous glass is incorporated with a thermoplastic polymer, i.e. crystalline polyester resins, as an aid to the mechanical properties. Unfortunately, in ductile resins, the addition of glasses can substantially lower the Izod impact strengths of the fiber reinforced compositions, and, also, substantially reduce the biaxial impact (instrumented impact) energies of such compositions.

The combination of a crystalline polymer, or a polymer blend containing one or more crystalline polymers, with fiberglass results in a material that has a tendency to warp after injection molding. Typically the degree of warpage can be reduced by using low injection speeds and long cooling times, but in general this leads to an increase in the injection molding cycle time, which results in a higher cost per part. Other techniques for reducing warp are set forth in the following U.S. Pat. Nos.: 4,460,731 to Kochanowski et al relating reinforced polyester compositions containing talc; 4,140,671 to Cohen relating to polyphenylene sulfide additions to polyesters; 4,140,669 to Phipps relating to talc and silica additions to polyester molding compositions; and 4,393,153 to Hepp relating to polyester compositions modified with mica and rubber. Plastics Engineering, May 1993, page 33, describes "Reducing Warp in Thermoplastics with Glass Fibers."

U.S. Pat. No. 5,441,997 describes polyester molding compositions which have ceramic like qualities, can be molded into relatively thin sections, and have high impact strength. The composition is directed to a polybutylene terephthalate and/or polyethylene terephthalate and an aromatic polycarbonate with inorganic fillers selected from the group consisting of barium sulfate, strontium sulfate, zirconium oxide and zinc sulfate. If desired, a styrene rubber impact modifier is described as an additive to the composition as well as a fibrous glass reinforcing filler. Although these compositions are suited for applications where ceramic like qualities are desired, compositions for injection molding having reduced warpage and a different property balance is desirable. Other U.S. Pat. Nos. describing filled polyester compositions include 5,149,734 and 4,043,971.

It is desirable to obtain further enhancements to a combination of properties including good impact strength, low warpage, good practical toughness, and reasonable cost.

SUMMARY OF THE INVENTION

The molded compositions of the present invention have desirable properties of reduced warpage with improved impact strength.

According to the present invention, a reinforced polyester molding composition comprises a polyester resin and glass fibers, wherein said glass fibers have a bimodal cross sectional area wherein a smaller cross sectional area is selected to improve impact strength and a larger cross sectional area is selected to improve warpage.

According to preferred embodiments, the polyester molding composition which, based on the weight of the total composition, comprises (a) from 20 to 50 weight percent of a polyester resin; (b) from 10 to 50 weight percent of a mineral filler; (c) from 5 to 40 weight percent glass fibers wherein the bimodal distribution as described above has at least about a 2 micron, preferably 3 micron difference between the smaller fiber diameter and the larger fiber diameter.

DESCRIPTION OF THE PREFERRED EMBODIMENTS

Figure 1:
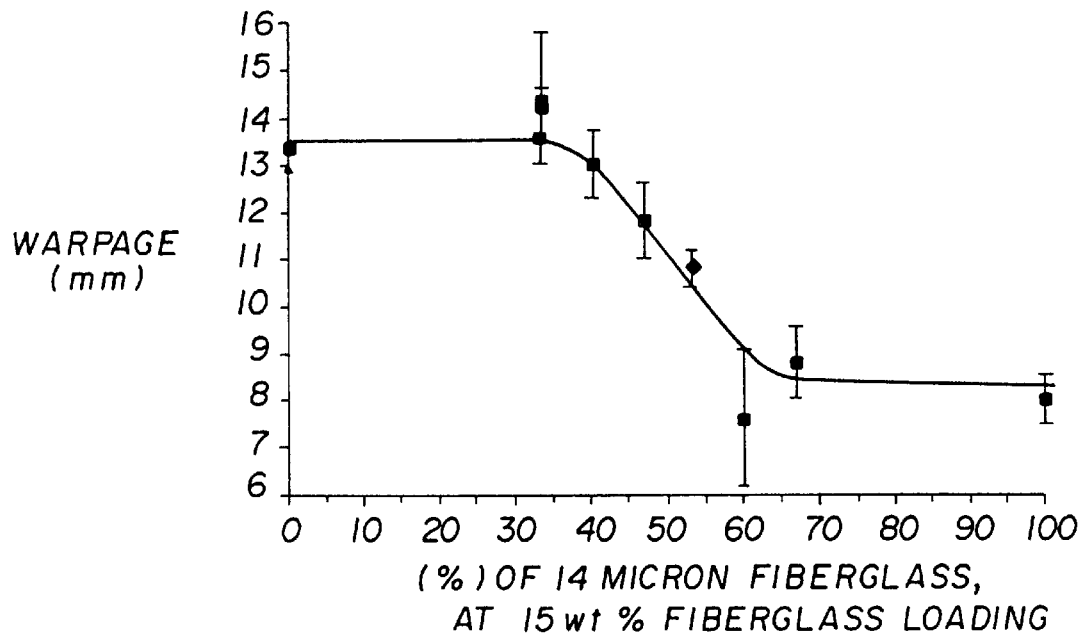
FIG. 1 is a graphical representation of the warpage vs. percentage of 10 and 14 micron diameter fibers at 15 weight percent total glass.

The glass fibers that are employed in the practice of this invention are typically in the form of filaments and glass strands. A strand is prepared from a number of filaments by bundling the filaments into what is called a strand. As employed, the glass fibers if in the form of chopped filaments or glass strands are typically one-fourth inch long or less.

In accordance with the principles of the present invention, the glass fibers have a bimodal cross section. The cross sectional area is measured in a plane perpendicular to the axial direction of the fiber. For a round fiber, the cross sectional area has a circular shape and is proportional to the fiber diameter. It is contemplated that other cross sectional shapes may be utilized. In such case, if non-round fiber cross sections are utilized, an equivalent measurement to diameter should be used.

Based on the diameter of said fibers, the smaller diameter fiber is selected to improve impact resistance and the other larger diameter fiber is selected to reduce warpage. The ratio of diameters of the smaller diameter fibers to the larger diameter fibers is preferably less than about 0.8. By way of illustration, if the smaller diameter fiber distribution is 6 microns and the larger diameter is 14 microns, the ratio of diameters of smaller to larger is 6/14 or 0.43. The preferred ratio by weight of larger diameter fibers to smaller diameter fibers present in the composition is from 45/55 to 90/20, more preferably from 55/45 to 80/20.

In a number of filled polyester containing composites, fiberglass is being used as one of the components to improve the modulus and impact strength. Using fiberglass materials of different diameter size, tends to result in different improvement of the physicals. For instance, in the case where the smaller diameter is 10 $\mu$m is used exclusively in the material, the resulting product has a higher unnotched Izod impact strength at equal modulus, than a material having fiberglass exclusively with a diameter of 14 $\mu$m.

It may be theorized, that, due to the larger surface area per unit of volume for the fiberglass with a diameter of 10 $\mu$m, the fiberglass—polymer interface available for stress transfer is larger, resulting in an improved ability to absorb energy upon impact. Another theory is that due to the larger amount of glass fibers with a diameter of 10 $\mu$m, compared to the situation of fiberglass of 14 $\mu$m, the occurrence of overlapping stress concentration areas is increased, leading to a large number of locally occurring energy absorbing deformation mechanisms.

In the case where glass fibers with a diameter of 10 $\mu$m are used exclusively in the material, the resulting material exhibits a larger degree of warpage after injection molding, compared to the situation where the material exclusively comprises fiberglass of 14 μm.

In the case where bimodal fibers are utilized with a diameter of 10 μm being the smaller diameter for impact resistance and 14 μm being the larger diameter for enhanced warpage, an unexpected, almost step-wise, improvement in warpage/impact balance is obtained as compared with material using either distribution exclusively.

The bimodal fiber combination results in a favorable combination of high impact strength and low warpage for the material. In the case described above where the smaller diameter is about 10 μm glass fibers and the larger diameter is about 14 μm glass fibers, the preferred ratio by according to weight of larger strength enhancing fibers to smaller diameter warpage reducing fibers is from about 45/55 to 90/20.

Figure 2:
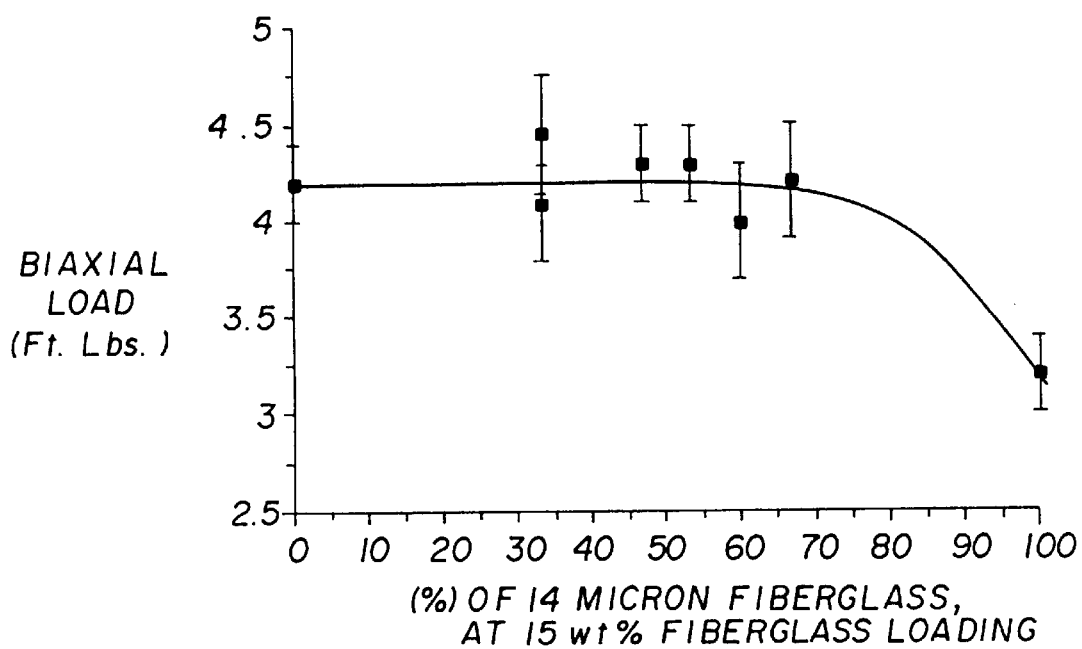
FIG. 2 is a graphical representation of the biaxial impact vs. percentage of 10 and 14 micron diameter fibers at 15 weight percent total glass.

An illustration of the described behavior is given in the form of FIG. 1 and FIG. 2. The data shown graphically in these two figures is given below in Table 1.

In the practice of this invention, the chopped glass strands, may be first blended with a resin and then fed to an extruder and the extrudate cut into pellets, or they may be separately fed to the feed hopper of an extruder. Generally, in the practice of this invention for preparing pellets of the composition set forth herein, the extruder is maintained at a temperature of approximately 450° F. to 550° F. The pellets so prepared when cutting the extrudate may be one-fourth inch long or less. As stated previously, such pellets contain finely divided uniformly dispersed glass fibers in the blend composition which comprises a polyester resin. The dispersed glass fibers are reduced in length as a result of the shearing action on the chopped glass strands in the extruder barrel. In addition, the amount of glass present in the composition can range anywhere from about 5 to about 50 weight percent based on the total weight of the thermoplastic blend composition, preferably from 10 to 30 percent by weight thereof.

Typically, the filament or strands are treated with a coating agent to give improved adhesion between the glass and the resin. The coating can comprise normal fiberglass coating materials: polyurethane resin, polyacrylate resin, polyester resin, polyepoxide resin, and functional silanes, especially epoxy or amine functional alkoxy silanes. The amount of the coating agent employed is generally that amount which is sufficient to bind the glass filaments into a continuous strand. Generally, this may be about 1.0 weight percent based on the weight of the glass filament.

The filamentous glass is available from a number of manufacturers. For compositions ultimately to be employed for electrical uses, it is preferred to use fibrous glass filaments comprised of lime-aluminum borosilicate glass that is relatively sodium free. This is known as "E" glass. However, other glass compositions are useful in the practice of the present invention, and all such glasses are contemplated as within the scope of the present invention. The filaments are made by standard processes, e.g., by steam or air blowing, flame blowing and mechanical pulling. The preferred filaments for plastics reinforcement are made by mechanical pulling In preparing the molding compositions of the present invention, it is convenient to use filamentous glass in the form of chopped strands of from about one-eighth to about 2 inches long. In articles molded from the compositions, on the other hand, even shorter lengths will be encountered because, during compounding, considerable fragmentation will occur.

Polyesters include those comprising structural units of the following formula:

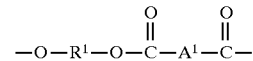

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The $R^1$ radical may be, for example, a $C_{2-10}$ alkylene radical, a $C_{6-12}$ alicyclic radical, a $C_{6-20}$ aromatic radical or a polyoxyalkylene radical in which the alkylene groups contain about 2–6 and most often 2 or 4 carbon atoms. The $A^1$ radical in the above formula is most often p- or m-phenylene, a cycloaliphatic or a mixture thereof. This class of polyester includes the poly(alkylene terephthalates). Such polyesters are known in the art as illustrated by the following patents, which are incorporated herein by reference.

U.S. Pat. Nos. 2,465,319 2,720,502 2,727,881 2,822,348 3,047,539 3,671,487 3,953,394 4,128,526

Examples of aromatic dicarboxylic acids represented by the dicarboxylated residue $A^1$ are isophthalic or terephthalic acid, 1,2-di(p-carboxyphenyl)ethane, 4,4'-dicarboxydiphenyl ether, 4,4' bisbenzoic acid and mixtures thereof. Acids containing fused rings can also be present, such as in 1,4- 1,5- or 2,6- naphthalenedicarboxylic acids. The preferred dicarboxylic acids are terephthalic acid, isophthalic acid, naphthalene dicarboxylic acid, cyclohexane dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") and (polypropylene terephthalate) ("PPT"), and mixtures thereof. Preferred blends of polyesters include blends that incorporate PBT and PET.

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid or ester component at least 70 mol %, preferably at least 80 mol %, of which consists of terephthalic acid, and polyester-forming derivatives therefore.

In one embodiment of the present invention, the polyesters may be blended with a polycarbonate resin. Polycarbonate resins useful in preparing the blends of the present invention are generally aromatic polycarbonate resins.

Typically these are prepared by reacting a dihydric phenol with a carbonate precursor, such as phosgene, a haloformate or a carbonate ester. Generally speaking, such carbonate polymers may be typified as possessing recurring structural units of the formula

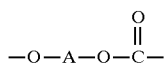

wherein A is a divalent aromatic radical of the dihydric phenol employed in the polymer producing reaction. The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; 2,2-bis(4-hydroxyphenyl) pentane; 2,4'-(dihydroxydiphenyl) methane; bis(2-hydroxyphenyl) methane; bis(4-hydroxyphenyl) methane; 1,1-bis(4-hydroxyphenyl)-3,3,5-trimethylcyclohexane; fluorenone bisphenol, 1,1-bis(4-hydroxyphenyl) ethane; 3,3-bis(4-hydroxyphenyl) pentane; 2,2'-dihydroxydiphenyl; 2,6-dihydroxynaphthalene; bis(4-hydroxydiphenyl)sulfone; bis(3,5-diethyl-4-hydroxyphenyl)sulfone; 2,2-bis(3,5-dibromo-4-hydroxyphenyl)propane; 2,2-bis(3,5-dimethyl-4-hydroxyphenyl)propane; 2,4'-dihydroxydiphenyl sulfone; 5'-chloro-2,4'-dihydroxydiphenyl sulfone; 4,4'-dihydroxydiphenyl ether; 4,4'-dihydroxy-3,3'-dichlorodiphenyl ether, and the like.

Other dihydric phenols which are also suitable for use in the preparation of the above polycarbonates are disclosed in U.S. Pat Nos. 2,999,835; 3,038,365; 3,334,154; and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid or hydroxy acid in the event a carbonate copolymer or interpolymer rather than a homopolymer is desired for use in the preparation of the polycarbonate mixtures of the invention. Polyarylates and polyester-carbonate resins or their blends can also be employed. Branched polycarbonates are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

In any event, the preferred aromatic carbonate for use in the practice in the present invention is a homopolymer, e.g., a homopolymer derived from 2,2-bis(4-hydroxyphenyl) propane (bisphenol-A) and phosgene, commercially available under the trade designation LEXAN Registered TM from General Electric Company.

The branched polycarbonates may be prepared by adding a branching agent during polymerization. These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol,tris-phenol TC (1,3,5-tris((p-hydroxyphenyl) isopropyl)benzene),tris-phenol PA (4(4(1,1-bis(p-hydroxyphenyl)-ethyl)alpha, alpha-dimethyl benzyl) phenol), 4-chloroformyl phthalic anhydride, trimesic acid and benzophenone tetracarboxylic acid. The branching agent may be added at a level of about 0.05–2.0 weight percent. Branching agents and procedures for making branched polycarbonates are described in U.S. Pat. Nos. 3,635,895; 4,001,184; and 4,204,047 which are incorporated by reference.

All types of polycarbonate end groups are contemplated as being within the scope of the present invention.

To impart other desirable properties, a compatible mineral filler may be utilized. Typically the mineral filler is present from 5 to about 70 percent and preferably from 20 to 50 percent by weight. Typical mineral fillers include alumina, amorphous silica, anhydrous aluminum silicates, feldspar, talc, milled glass, phenolic resins, glass microspheres, metal oxides such as titanium dioxide, zinc sulfide, ground quartz, clays such as hydrated aluminum silicate, and the like. For a ceramic like look and feel, typical mineral fillers include metal sulfate salts as well as their hydrates. The preferred metal sulfate salts are the Group IA and Group IIA metal sulfates with barium, calcium and magnesium sulfates being preferred.

Barium sulfate which is non-toxic and insoluble in dilute acids is especially preferred. Barium sulfate may be in the form of the naturally occurring barytes or as synthetically derived barium sulfate using well known synthetic techniques. The particle size may vary from 0.5 to 50 microns, preferably from 1 to 15 microns and most preferably 8 microns.

When the polyester resin includes an aromatic polycarbonate resin present with a mineral filler, the polycarbonate is preferably present at a level of from greater than 0 to about 15 percent by weight based on the total weight of the material. When no mineral filler is present, a preferred composition comprises polyester resin and from 5 to 50 percent by weight of polycarbonate based on the total weight of the thermoplastic resin composition.

Additional ingredients may include other thermoplastic resins in an amount up to about 50 percent by weight based on the weight of the formulation. Such other suitable thermoplastic resins which may be used include polyamides, acrylic and methacrylic polymers or copolymers; epoxy resins; polyetherimides; phenylene oxide based resins such as polyphenylene oxide and blends of polyphenylene oxide and styrene resins; polyaryl ethers; polyphenylene sulfides; polyetherketones, aliphatic polyketones, polysulfones; and ordered aromatic copolymers especially liquid crystalline polymers.

Such additional resin compositions may include, an effective amount of any of the known impact modifiers useful for polyesters and polyester blends. These may be added to the compositions by themselves or in combination with the aforementioned aromatic polycarbonates. The preferred impact modifiers generally comprise an acrylic or methacrylic grafted polymer of a conjugated diene or an acrylate elastomer, alone or co-polymerized with a vinyl aromatic compound. Especially preferred grafted polymers are the core-shell polymers of the type available from Rohm & Haas, for example Acryloid EXL2691 and Acryloid EXL3330. In general these impact modifiers contain units derived from butadiene or in combination with a vinyl aromatic compound, acrylate, or alkylacrylate ester such as methacrylate. The aforementioned impact modifiers are believed to be disclosed in Fromuth, et al., U.S. Pat. No. 4,180,494; Owens, U.S. Pat. No. 3,808,180; Farnham, et al., U.S. Pat. No. 4,096,202; and Cohen, et al., U.S. Pat. No. 4,260,693, all incorporated herein by reference.

Additional preferred impact modifiers are of the type disclosed in U.S. Pat. No. 4,292,233, incorporated by reference. These impact modifiers comprise, generally, a relatively high content of a partially cross-linked butadiene polymer grafted base having grafted thereon acrylonitrile and styrene.

Other ingredients employed in low amounts, typically less than 5 percent by weight of the total composition, include stabilizers, lubricants, colorants, plasticizers, nucleants, antioxidants and UV absorbers. These ingredients should be selected so as not to deleteriously affect the desired properties of the molded resin.

In the thermoplastic compositions which contain a polyester and a polycarbonate resin, it is preferable to use a stabilizer material. Typically, such stabilizers are used at a level of 0.01–10 weight percent and preferably at a level of from 0.05–2 weight percent. The preferred stabilizers include an effective amount of an acidic phosphate salt; an acid, alkyl, aryl or mixed phosphite having at least one hydrogen or alkyl group; a Group IB or Group IIB metal phosphate salt; a phosphorous oxo acid, a metal acid pyrophosphate or a mixture thereof. The suitability, of a particular compound for use as a stabilizer and the determination of how much is to be used as a stabilizer may be readily determined by preparing a mixture of the polyester component, the polycarbonate with and without the particular compound and determining the effect on melt viscosity or color stability or the formation of interpolymer. The acidic phosphate salts include sodium dihydrogen phosphate, mono zinc phosphate, potassium hydrogen phosphate, calcium hydrogen phosphate and the like. The phosphites may be of the formula:

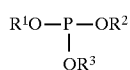

where $R^1$, $R^2$ and $R^3$ are independently selected from the group consisting of hydrogen, alkyl and aryl with the proviso that at least one of $R^1$, $R^2$ and $R^3$ is hydrogen or alkyl.

The phosphate sales of a Group IB or Group IIB metal include zinc phosphate, copper phosphate and the like. The phosphorous oxo acids include phosphorous acid, phosphoric acid, polyphosphoric acid or hypophosphorous acid.

The polyacid pyrophosphates of the formula:

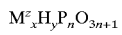

wherein M is a metal, x is a number ranging from 1 to 12 and y is a number ranging 1 to 12, n is a number from 2 to 10, z is a number from 1 to 5 and the sum of (xz)+y is equal to n+2.

These compounds include $Na_3HP_2O_7$; $K_2H_2P_2O_7$; $KNaH_2P_2O_7$ and $Na_2H_2P_2O_7$. The particle size of the polyacid pyrophosphate should be less than 75 microns, preferably less than 50 microns and most preferably less than 20 microns.

The amount of flame-retardant additive should be present in an amount at least sufficient to reduce the flammability of the polyester resin, preferably to a UL94 V-0 rating. The amount will vary with the nature of the resin and with the efficiency of the additive. In general, however, the amount of additive will be from 2 to 20 percent by weight based on the weight of resin. A preferred range will be from about 5 to 15 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof. Poly (haloaryl acrylate) is preferred with the most preferably being poly (pentabromobenzyl acrylate). PBB-PA has been known for some time, and is a valuable flame-retardant material, useful in a number of synthetic resins. PBB-PA is prepared by the polymerization of pentabromobenzyl acrylate ester (PBB-MA). The PBB-PA polymeric flame-retardant material is incorporated into the synthetic resin during processing to impart flame retardant characteristics.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins. Other aromatic carbonate flame retardants are set forth in U.S. Pat. No. 4,636,544 to Hepp.

The flame retardants are typically used with a synergist, particularly inorganic antimony compounds. Such compounds are widely available or can be made in known ways. Typical, inorganic synergist compounds include $Sb_2O_5$; $SbS_3$; and the like. Especially preferred is antimony trioxide ($Sb_2O_3$). Synergists such as antimony oxides, are typically used at about 0.5 to 15, and more preferably from 1 to 6 percent by weight based on the weight percent of resin in the final composition.

Also, the final composition may contain polytetrafluoroethylene (PTFE) type resins or copolymers used to reduce dripping in flame retardant thermoplastics.

The composition of the present invention preferably exhibits a molding processing range making it suitable for injection molding. The preferred melt viscosity is from about 1,000 to about 10,000 poise, preferably from about 4,000 to about 9,000 as measured using a Tinius Olson melt indexer at 266 degrees Centigrade, 0.0825 inch orifice (ASTM method D-1238)).

The composition of this invention finds utility in preparing or forming articles by injection molding, extrusion, compression molding or blow molding wherein the articles have increased strength by employing the fibrous glass so described herein.

EXAMPLES

Examples of the invention are given in the different tables listed below. In Table 1, where the composition of nine different composites is given along with their physical properties, examples of the invention 1, 2, 3 and 4 exhibit a superior balance of low warpage/high impact strength at equal melt viscosity, flexural modulus and tensile strength, measured against the comparative examples A, B, C, D and E.

A similar behavior is seen in Table 2, which shows the composition as well as the properties of blends based on 30 wt % fiberglass and crystalline polymer. Using 10 wt % 10

μm fiberglass and 20 wt % 14 μm fiberglass instead (Example 5) leads to a significant reduction of the warpage at almost constant mechanical properties. The Examples E, G and H show higher warpage and/or lower impact. Therefore, comparing the results from Tables 1 and 2, the conclusion can be drawn that the present invention covers both mineral filled and non-mineral filled polymer or polymer blends.

In Table 3, a 30% glass filled flame retarding polyester, Example 6 with a ratio of large diameter to small diameter of 2:1 gives improved results compared to the comparative Examples I, J, and K. Example 7 of Table 4 illustrates similar improved results with the PBT/PET/PC blend as compared to the comparative Examples L, M and N.

In Table 5 the results are shown for the combination of 15 μm fiberglass with 25 μm fiberglass. As in the case of the previous examples, Example 8 of Table 5 illustrates similar improved results with the mineral filled PBT/PET/PC blend as compared to the comparative Examples M, N and O.

The formulations shown in the Tables below were preblended and extruded on a Werner Pfleiderer Extruder at a die head temperature of about 250°–260° C. The extrudate was cooled through a water bath prior to pelletizing. Test parts were injection molded on a Van Dorn molding machine with a set temperature of approximately 250°–260° C. The resin was dried for 3–4 hours at 120° C. in a forced air circulating oven prior to injection molding.

As set forth in the following Tables, the properties are measured according to the following procedures.

Warpage: Warpage is measured using round plaques with a diameter of 4.000" and a thickness of 0.062". The plaques are oven aged for one hour at 200°±2° F. The hot plaques are placed on a flat surface to cool. A minimum time of two hours is allowed for the plaques to cool down. The warpage is measured at the position of the plaques where the warpage is the largest. This position is found by pushing the edge of the plaques down at different points of the plaque. The warpage is measured from the flat surface to the bottom edge of the plaque using a ruler, and expressed in millimeters (mm). Typically, the average of the measurements of five plaques is reported.

Notched Izod: This test procedure is based on the ASTM D256 method. In this case, using Izod Method E, the unnotched impact strength is obtained by testing an unnotched specimen. The results of the test is reported in terms of energy absorbed per unit of specimen width, and expressed in foot times pounds per inch (Ft.Lbs./In.). Typically the final test result is calculated as the average of test results of five test bars.

Biaxial impact test: This test procedure is based on the ASTM D3763 method and was performed on a Dynatap impact test machine. This procedure provides information on how a material behaves under multiaxial deformation conditions. The deformation applied is a high speed puncture. An example of a supplier of this type of testing equipment is Dynatup. Reported as the test result is the so-called total energy absorbed (TE), which is expressed in foot times pounds (Ft.Lbs.). The final test result is calculated as the average of the test results of typically ten test plaques.

Melt viscosity: This test procedure is based on the ASTM D1238 method. The equipment used is an extrusion plastometer equipped with an automatic timer. A typical example of this equipment would be the Tinius Olson MP 987. Before testing, the samples are dried for one hour at 150° C. The testing conditions are a melt temperature of 266° C., a total load of 5,000 gram, an orifice diameter of 0.0825 inch, and a dwell time of 5 minutes. The test result is expressed in the unit Poise.

Flexural Modulus: This test procedure is based on the ASTM D790 method. Typical test bars have the following dimensions: ⅛ inch times ½ inch times 2½ inch. The final test result is calculated as the average of test results of five test bars. The test involves a three point loading system utilizing center loading on a simply supported beam. Instron and Zwick are typical examples of manufacturers of instruments designed to perform this type of test. The flexural modulus is the ratio, within the elastic limit, of stress to corresponding strain and is expressed in pounds per square inch (psi).

Tensile Strength: This test procedure is based on the ASTM D638 method. Test bars in the form of the standard dumbbell shape are used in this test method. The final test result is calculated as the average of the test results of five test bars. The tensile strength is calculated by dividing the maximum load observed in the test by the original minimum cross-sectional area of the test specimen. The result is expressed in pounds per square inch (psi). Instron and Zwick are typical examples of manufacturers of instruments designed to perform this type of test.

In the Tables the following ingredients are as follows:

1) Irganox 1010 antioxidant from Ciba-Gigy—tetrakis (methylene-3(3',5'-di-tert-butyl-4-hydroxyphenyl) propionate)methane
2) PE-18—pentaerythrithol tetrastearate
3) Tinuvin 234—UV absorber, substituted hydroxyphenyl benzotriazole from Ciba-Geigy Corporation
4) PTFE—polytetrafluoroethylene
5) EVA—ethylene-vinyl acetate
6) SAN—styrene-acrylonitrile
7) Irganox 1076—Hindered Penolic Anti-Oxidant from Ciba-Gigy
8) PC—polycarbonate
9) FR-25—brominated polycarbonate from Great Lakes Chemical

TABLE 1

Composites containing fiberglass, mineral filler, crystalline polymers and amorphous polymer

| Component | Unit | Comp. Example A | Comp. Example B | Comp. Example C | Comp. Example D | Example 1. |
|---|---|---|---|---|---|---|
| Fiberglass, 10 μm | wt % | 15.0 | 10.0 | 10.0 | 9.0 | 8.0 |
| Fiberglass, 14 μm | wt % | 0.0 | 5.0 | 5.0 | 6.0 | 7.0 |
| PC | wt % | 5.0 | 5.0 | 5.0 | 5.0 | 5.0 |
| PBT | wt % | 33.1 | 33.1 | 33.35 | 33.35 | 33.35 |
| PET | wt % | 15.8 | 15.8 | 15.8 | 15.8 | 15.8 |
| BaSO₄ | wt % | 30.0 | 30.0 | 30.0 | 30.0 | 30.0 |

TABLE 1-continued

Composites containing fiberglass, mineral filler, crystalline polymers and amorphous polymer

| | | | | | |
|---|---|---|---|---|---|
| Irganox 1010 (1) | wt % | 0.20 | 0.20 | 0.20 | 0.20 | 0.20 |
| PE-18 (2) | wt % | 0.20 | 0.20 | 0.20 | 0.20 | 0.20 |
| Tinuvin 234 (3) | wt % | 0.30 | 0.30 | 0.30 | 0.30 | 0.30 |
| $Zn_3(PO_4)_2$ | wt % | 0.40 | 0.40 | — | — | — |
| $ZnHPO_4$ | wt % | — | — | 0.15 | 0.15 | 0.15 |
| Warpage | mm | 13.4 | 14.4 | 14.2 | 13.0 | 11.8 |
| Unnotched Izod | Ft.Lbs./In. | 8.5 | 8.6 | — | — | — |
| Biaxial Load (TE) | Ft.Lbs | 4.2 | 4.5 | 4.1 | 4.3 | 4.3 |
| Melt Viscosity | Poise | 4,100 | 3,700 | 3,900 | 3,900 | 3,800 |
| Flexural Modulus | psi | 920,000 | 1,010,000 | 900,000 | 940,000 | 920,000 |
| Tensile Strength | psi | 14,000 | 14,000 | 13,000 | 13,000 | 13,000 |

| Component | Unit | Example 2. | Example 3. | Example 4. | Comp. Example E |
|---|---|---|---|---|---|
| Fiberglass, 10 μm | wt % | 7.0 | 6.0 | 5.0 | 0.0 |
| Fiberglass, 14 μm | wt % | 8.0 | 9.0 | 10.0 | 15.0 |
| PC (8) | wt % | 5.0 | 5.0 | 5.0 | 5.0 |
| PBT | wt % | 33.35 | 33.35 | 33.1 | 33.1 |
| PET | wt % | 15.8 | 15.8 | 15.8 | 15.8 |
| $BaSO_4$ | wt % | 30.0 | 30.0 | 30.0 | 30.0 |
| Irganox 1010 (1) | wt % | 0.20 | 0.20 | 0.20 | 0.20 |
| PE-18 (2) | wt % | 0.20 | 0.20 | 0.20 | 0.20 |
| Tinuvin 234 (3) | wt % | 0.30 | 0.30 | 0.30 | 0.30 |
| $Zn_3(PO_4)_2$ | wt % | — | — | 0.40 | 0.40 |
| $ZnHPO_4$ | wt % | 0.15 | 0.15 | — | — |
| Warpage | mm | 10.8 | 7.6 | 8.8 | 8.0 |
| Unnotched Izod | Ft.Lbs./In. | — | — | 7.9 | 6.8 |
| Biaxial Load (TE) | Ft.Lbs | 4.3 | 4.0 | 4.2 | 3.2 |
| Melt Viscosity | Poise | 3,800 | 3,900 | 3,800 | 3,600 |
| Flexural Modulus | psi | 880,000 | 880,000 | 1,000,000 | 970,000 |
| Tensile Strength | psi | 13,000 | 13,000 | 13,000 | 14,000 |

TABLE 2

Composites containing fiberglass and crystalline polymer

| Component | Unit | Comp. Example F | Comp. Example G | Example 5. | Comp. Example H |
|---|---|---|---|---|---|
| Fiberglass, 10 μm | wt % | 25.0 | 20.0 | 10.0 | 5.0 |
| Fibergalss, 14 μm | wt % | 5.0 | 10.0 | 20.0 | 25.0 |
| PBT | wt % | 69.1 | 69.1 | 69.1 | 69.1 |
| Irganox 1010 (1) | wt % | 0.25 | 0.25 | 0.25 | 0.25 |
| PE-18 (2) | wt % | 0.25 | 0.25 | 0.25 | 0.25 |
| $Zn_3(PO_4)_2$ | wt % | 0.40 | 0.40 | 0.40 | 0.40 |
| Warpage | mm | 34 | 34 | 25 | 24 |
| Unnotched Izod | Ft.Lbs./In. | 13.3 | 12.0 | 12.5 | 10.1 |
| Biaxial Load (TE) | Ft.Lbs | 6.7 | 7.3 | 7.2 | 5.7 |
| Melt Viscosity | Poise | 3,500 | 3,500 | 3,500 | 3,400 |
| Flexural Modulus | psi | 940,000 | 920,000 | 950,000 | 920,000 |
| Tensile Strength | psi | 18,000 | 20,000 | 20,000 | 20,000 |

TABLE 3

Composites containing fiberglass in an ignition resistant formulation

| Component | Unit | Comp. Example I | Comp. Example J | Example 6. | Comp. Example K |
|---|---|---|---|---|---|
| Fiberglass, 10 μm | wt % | 30.0 | 20.0 | 10.0 | — |
| Fiberglass, 14 μm | wt % | — | 10.0 | 20.0 | 30.0 |
| PBT | wt % | 55.5 | 55.5 | 55.5 | 55.5 |
| FR25 (9) | wt % | 8.84 | 8.84 | 8.84 | 8.84 |
| $Sb_2O_3$ | wt % | 2.64 | 2.64 | 2.64 | 2.64 |
| PTFE (4) | wt % | 0.37 | 0.37 | 0.37 | 0.37 |
| EVA (5) | wt % | 1.65 | 1.65 | 1.65 | 1.65 |
| SAN (6) | wt % | 0.30 | 0.30 | 0.30 | 0.30 |
| Irganox 1076 (7) | wt % | 0.10 | 0.10 | 0.10 | 0.10 |
| PE-18 (2) | wt % | 0.20 | 0.20 | 0.20 | 0.20 |
| $Zn_3(PO_4)_2$ | wt % | 0.40 | 0.40 | 0.40 | 0.40 |
| Warpage | mm | 23 | 23 | 19 | 19 |
| Unnotched Izod | Ft.Lbs./In. | 13.5 | 13.8 | 13.0 | 11.2 |
| Biaxial Load (TE) | Ft.Lbs | 4.8 | 4.7 | 4.6 | 4.0 |
| Melt Viscosity | Poise | 7,200 | 7,600 | 7,000 | 7,000 |
| Flexural Modulus | psi | 1,100,000 | 1,100,000 | 1,100,000 | 1,100,000 |
| Tensile Strength | psi | 19,800 | 19,500 | 19,000 | 18,500 |

TABLE 4

Composites containing fiberglass, crystalline polymers and amorphous polymer

| Components | Units | Comp. Example L | Example 7. |
|---|---|---|---|
| Fiberglass, 10 μm | wt % | 10.0 | 5.0 |
| Fiberglass, 14 μm | wt % | 5.0 | 10.0 |
| PC (8) | wt % | 7.5 | 7.5 |
| PBT | wt % | 52.4 | 52.4 |
| PET | wt % | 24.5 | 24.5 |
| Irganox 1010 (1) | wt % | 0.25 | 0.25 |
| PE-18 (2) | wt % | 0.25 | 0.25 |
| ZnHPO$_4$ | wt % | 0.10 | 0.10 |
| Warpage | mm | 6.0 | 2.2 |
| Unnotched Izod | Ft.Lbs./In. | 4.7 | 5.5 |
| Biaxial Load (TE) | Ft.Lbs | 3.2 | 2.9 |
| Melt Viscosity | Poise | 4,000 | 4,100 |
| Flexural Modulus | psi | 570,000 | 620,000 |
| Tensile Strength | psi | 12,000 | 13,300 |

TABLE 5

Composites containing fiberglass, mineral filler, crystalline polymers and amorphous polymer

| Component | Unit | Comp. Example M | Comp. Example N | Example 8. | Comp. Example O |
|---|---|---|---|---|---|
| Fiberglass, 15 μm | wt % | 15.0 | 10.0 | 5.0 | — |
| Fiberglass, 20 μm | wt % | — | 5.0 | 10.0 | 15.0 |
| PC (8) | wt % | 5.0 | 5.0 | 5.0 | 5.0 |
| PBT | wt % | 33.1 | 33.1 | 33.1 | 33.1 |
| PET | wt % | 15.8 | 15.8 | 15.8 | 15.8 |
| BaSO4 | wt % | 30.0 | 30.0 | 30.0 | 30.0 |
| Irganox 1010 (1) | wt % | 0.20 | 0.20 | 0.20 | 0.20 |
| PE-18 (2) | wt % | 0.20 | 0.20 | 0.20 | 0.20 |
| Tinuvin 234 (3) | wt % | 0.30 | 0.30 | 0.30 | 0.30 |
| Zn$_3$(PO$_4$)$_2$ | wt % | 0.40 | 0.40 | 0.40 | 0.40 |
| Warpage | mm | 10 | 9.0 | 3.4 | 2.0 |
| Unnotched Izod | Ft.Lbs./In. | 5.4 | 4.6 | 5.2 | 3.2 |
| Biaxial Load (TE) | Ft.Lbs | 3.3 | 3.2 | 2.9 | 2.2 |
| Melt Viscosity | Poise | 4,000 | 4,300 | 3,900 | 3,100 |
| Flexural Modulus | psi | 906,000 | 874,000 | — | — |
| Tensile Strength | psi | 13,900 | 13,000 | 11,400 | 9,500 |

TABLE 6

Composites containing fiberglass and amorphous polymer

| Component | Units | Comp. Example P | Comp. Example Q |
|---|---|---|---|
| Fiberglass, 10 μm | wt % | 10.0 | 5.0 |
| Fiberglass, 14 μm | wt % | 5.0 | 10.0 |
| PC (8) | wt % | 84.5 | 84.5 |
| Irganox 1010 (1) | wt % | 0.25 | 0.25 |
| PE-18 (2) | wt % | 0.25 | 0.25 |
| Warpage | mm | 0.0 | 0.0 |
| Unnotched Izod | Ft.Lbs./In. | 20.6 | 20.7 |
| Biaxial Load (TE) | Ft.Lbs | 21.5 | 21.7 |
| Melt Viscosity | Poise | 43,100 | 43,300 |
| Flexural Modulus | psi | 540,000 | 560,000 |
| Tensile Strength | psi | 12,100 | 11,900 |

TABLE 7

Composites containing fiberglass, mineral filler and amorphous polymer

| Component | Units | Comp. Example R | Comp. Example S |
|---|---|---|---|
| Fiberglass, 10 μm | wt % | 10.0 | 5.0 |
| Fiberglass, 14 μm | wt % | 5.0 | 10.0 |
| PC (8) | wt % | 59.5 | 59.5 |
| BaSO$_4$ | wt % | 25.0 | 25.0 |
| Irganox 1010 (1) | wt % | 0.25 | 0.25 |
| PE-18 (2) | wt % | 0.25 | 0.25 |
| Warpage | mm | 0.0 | 0.0 |
| Unnotched Izod | Ft.Lbs./In. | 10.8 | 11.9 |
| Biaxial Load (TE) | Ft.Lbs | 18.7 | 18.8 |
| Melt Viscosity | Poise | 59,500 | 58,800 |
| Flexural Modulus | psi | 740,000 | 760,000 |
| Tensile Strength | psi | 12,000 | 11,900 |

In Table 6 and Table 7 further examples for comparison are shown. The blends shown in Table 6 are based on an amorphous polymer filled with fiberglass. These blend do not show warpage, and for that reason mixing fiberglass types having different diameter does not affect the warpage further.

Table 7 provides supplementary confirmation of this point: Likewise a mineral filler and fiberglass filled amorphous polymer does not exhibit the behavior of the present invention.

In conclusion, the results from Tables 1 through 7 show that the present invention applies to fiberglass filled crystalline polymer or polymer blends containing at least one crystalline polymer, with or without additional mineral fillers.

What is claimed is:

1. A reinforced polyester molding composition comprising a polyester poly(alkylene terephthalate) resin and glass fibers, wherein said glass fibers have a bimodal cross sectional area wherein one smaller diameter fiber cross sectional area is selected to improve impact strength and the other larger diameter cross sectional area is selected to improve warpage wherein the ratio of diameters of the smaller diameter fibers to the larger diameter fibers is less than about 0.8 and the distribution of larger diameter fibers to smaller diameter fibers is from 55/45 to 90/20, said smaller fiber diameter distribution being from about 6 to about 15 microns.

2. A reinforced polyester molding composition according claim 1 wherein said fibers have a circular shaped cross section and said bimodal cross sectional area comprises fibers having a smaller fiber diameter selected to improve impact strength and fibers having a larger fiber diameter selected to improve warpage wherein said larger size fiber distribution is from 14 to 20 microns and the difference between said larger and said smaller distribution is at least 2 microns.

3. A reinforced polyester molding composition according claim 2 additionally comprising a polycarbonate resin.

4. A reinforced polyester molding composition according claim 1 wherein said poly(alkylene terephthalate) resin comprises poly(ethylene terephthalate), poly(butylene terephthalate), and mixtures thereof.

5. A reinforced polyester molding composition according claim 2 additionally comprising a halogenated flame retardant.

6. A reinforced polyester molding composition according claim 5 wherein the amount of glass present in the composition is from about 5 to about 50 weight percent based on the total weight of the thermoplastic blend composition.

7. A reinforced polyester molding composition according claim 6 wherein the amount of glass present in the composition is from about 10 to 30 percent by weight.

8. A reinforced polyester resin molding composition according to claim 8 comprising (a) from 20 to 50 weight percent of a polyester resin; (b) from 10 to 50 weight percent of a mineral filler; (c) from 5 to 40 weight percent glass fibers.

9. A reinforced polyester molding composition according claim 8 additionally comprising a polycarbonate resin present in an amount from greater than 1 to 15 percent by weight.

10. A reinforced polyester molding composition according claim 9 wherein said polyester resin comprises a poly (alkylene terephthalate) resin.

11. A reinforced polyester molding composition according claim 8 wherein said poly(alkylene terephthalate) resin comprises poly(ethylene terephthalate), poly(butylene terephthalate), and mixtures thereof.

12. A reinforced polyester molding composition according claim 8 additionally comprising a halogenated flame retardant.

13. A reinforced polyester molding composition according claim 8 additionally wherein said mineral filler is barium sulfate.

14. A reinforced polyester resin molding composition according to claim 8 wherein said bimodal diameter comprising first fibers having a diameter of about 10 $\mu$m for enhancing impact resistance and second fibers having a diameter of about 14 $\mu$m for reducing warpage.

15. A reinforced polyester resin molding composition according to claim 8 wherein said polyester is selected from the group consisting of poly(ethylene terephthalate), and poly(1,4-butylene terephthalate), poly(ethylene naphthanoate), poly(butylene naphthanoate), and (polypropylene terephthalate), and mixtures thereof.

16. A molded article having the composition of claim 1.

17. A molded article having the composition of claim 8.

18. A molded article having the composition of claim 8.

19. A molded article according to claim 8 comprising a sink, basin, drainpan or tub.

* * * * *